United States Patent
Kim et al.

(10) Patent No.: US 9,571,153 B2
(45) Date of Patent: Feb. 14, 2017

(54) METHOD OF CANCELLING SI SIGNAL AT RF-FRONT END AND UE FOR THE SAME

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Jinmin Kim, Seoul (KR); Byung-Wook Min, Seoul (KR); Donghyun Lee, Gwacheon-si (KR); Jaehoon Chung, Seoul (KR); Kwangseok Noh, Seoul (KR)

(73) Assignees: LG ELECTRONICS INC., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 110 days.

(21) Appl. No.: 14/569,159

(22) Filed: Dec. 12, 2014

(65) Prior Publication Data
US 2016/0173164 A1    Jun. 16, 2016

(51) Int. Cl.
| | | |
|---|---|---|
| H04B 1/44 | (2006.01) | |
| H04B 1/12 | (2006.01) | |
| H04B 1/525 | (2015.01) | |
| H04B 1/04 | (2006.01) | |
| H04L 5/14 | (2006.01) | |

(52) U.S. Cl.
CPC .............. *H04B 1/44* (2013.01); *H04B 1/0475* (2013.01); *H04B 1/12* (2013.01); *H04B 1/525* (2013.01); *H04L 5/14* (2013.01)

(58) Field of Classification Search
CPC ............. H04B 1/44; H04B 1/12; H04B 1/525; H04B 1/0475; H04L 5/14; H04L 5/1407; H04L 5/1415; H04L 5/143
USPC ......................................................... 370/278
See application file for complete search history.

(56) References Cited

U.S. PATENT DOCUMENTS

| | | | |
|---|---|---|---|
| 7,511,658 B1 * | 3/2009 | Grebennikov .......... | G01S 7/034 342/175 |
| 2006/0087385 A1 * | 4/2006 | Fitzpatrick .............. | G01S 7/026 333/117 |
| 2009/0023405 A1 * | 1/2009 | Forstner .................. | G01S 7/034 455/115.1 |
| 2009/0206945 A1 * | 8/2009 | Wagner ................... | G01S 7/034 333/101 |
| 2009/0268642 A1 * | 10/2009 | Knox ...................... | H04L 12/66 370/277 |
| 2009/0289737 A1 * | 11/2009 | Itoh ........................ | H01P 5/222 333/120 |
| 2011/0102241 A1 * | 5/2011 | Stewart ................... | G01S 7/034 342/104 |
| 2011/0102246 A1 * | 5/2011 | Moulton ................. | G01S 7/032 342/159 |

(Continued)

*Primary Examiner* — Chi H Pham
*Assistant Examiner* — Robert Lopata
(74) *Attorney, Agent, or Firm* — Lee Hong Degerman Kang & Waimey (57) ABSTRACT

A user equipment (UE) for cancelling a self-interference (SI) signal is disclosed. The UE includes a rat-race coupler, a plurality of transceiving antennas capable of transmitting and receiving signals, a receive antenna, a transmission (Tx) chain connected to an input port when the rat-race coupler uses one port as the input port, and a reception (Rx) chain connected to the receive antenna and an isolated port when the rat-race coupler uses the one port as the input port.

7 Claims, 9 Drawing Sheets

(56) References Cited

U.S. PATENT DOCUMENTS

| | | | |
|---|---|---|---|
| 2012/0098698 A1* | 4/2012 | Reuter | G01S 7/03 342/200 |
| 2013/0147664 A1* | 6/2013 | Lin | H01Q 25/00 342/372 |
| 2013/0278457 A1* | 10/2013 | Kamo | G01S 13/42 342/146 |
| 2013/0324056 A1* | 12/2013 | Maguire | H01Q 1/245 455/73 |
| 2014/0170995 A1* | 6/2014 | Lin | H04B 1/44 455/83 |
| 2015/0078217 A1* | 3/2015 | Choi | H04B 1/525 370/278 |
| 2015/0180590 A1* | 6/2015 | Wagner | H04B 1/40 455/90.2 |
| 2015/0200455 A1* | 7/2015 | Venkateswaran | H01Q 1/246 342/372 |
| 2016/0028455 A1* | 1/2016 | Ma | H04B 7/0456 375/297 |

\* cited by examiner

— Communication Region (TX AF > 0 dB & RXP AF > 0 dB)
— TX Null Region (TX AF < -6 dB)

METHOD OF CANCELLING SI SIGNAL AT RF-FRONT END AND UE FOR THE SAME

BACKGROUND OF THE INVENTION

Field of the Invention

The present invention relates to radio communication, and more particularly, to a method of cancelling a self-interference (SI) signal at a radio frequency (RF)-front end and a user equipment (UE) for the same.

Discussion of the Related Art

A full-duplex radio (FDR) or full-duplex communication scheme refers to a communication scheme for simultaneously supporting transmission and reception using the same resource in one user equipment (UE). In this case, the same resource refers to the same time and the same frequency. FDR communication or full-duplex communication is referred to as two-way communication.

Figure 1:
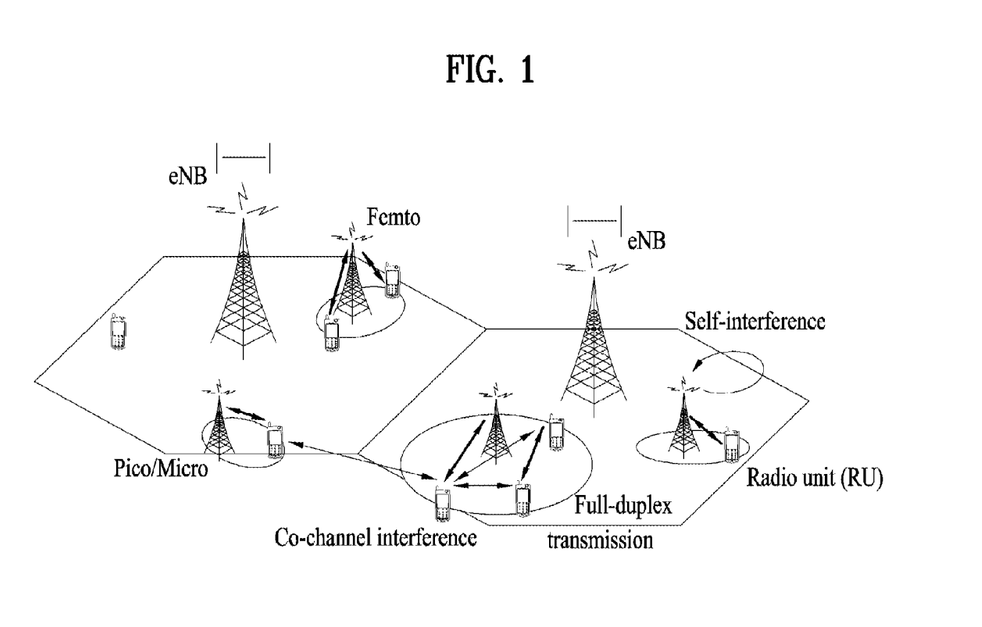
FIG. 1 is a conceptual diagram illustrating a user equipment (UE) and a base station (BS), which support a full-duplex radio (FDR)

FIG. 1 is a diagram illustrating concept of a UE and a base station (BS), which support FDR. Referring to FIG. 1, in a network state that supports FDR, there are three types of interferences. First interference is intra-device self-interference. The intra-device self-interference refers to interference caused by signals that are transmitted from a transmission (Tx) antenna and received by a receiving (Rx) antenna in one BS or UE. Since the signals transmitted from the Tx antenna are transmitted with high power and a distance between the Tx antenna and the Rx antenna is small, the transmitted signals are received by the Rx antenna while attenuation is barely caused, and thus, are received with higher power than a desired signal. Second interference is UE to UE inter-link interference. In a network that supports FDR, the UE to UE inter-link interference is increasingly caused. The UE to UE inter-link interference refers to interference caused by uplink signals that are transmitted from a UE and received by an adjacently positioned UE. Third interference is BS to BS inter-link interference. Similarly, in a network state that supports FDR, BS to BS inter-link interference is increasingly caused. The BS to BS inter-link interference refers to interference caused by signals that are transmitted between BSs or heterogeneous BSs (pico, femto, and relay) in a HetNet state and received by an Rx antenna of another BS.

Among the three types of interferences, the intra-device self-interference (hereinafter, referred to as self-interference) is influence of interference caused only in FDR. In order to manage FDR, a most serious problem is cancellation of self-interference. However, methods for effectively cancelling self-interference in an FDR state have not been discussed in detail.

SUMMARY OF THE INVENTION

An object of the present invention is to provide a user equipment (UE) for cancelation of a self-interference (SI) signal.

Another object of the present invention is to provide a method of cancelling an SI signal at a radio frequency (RF)-front end of the UE.

The technical objects that can be achieved through the present invention are not limited to what has been particularly described hereinabove and other technical objects not described herein will be more clearly understood by persons skilled in the art from the following detailed description.

To achieve these objects and other advantages and in accordance with the purpose of the invention, as embodied and broadly described herein, a UE for cancelling an SI signal, the UE includes a rat-race coupler, a plurality of transceiving (transmit/receive) antennas capable of transmitting and receiving signals; a receive antenna; a transmission (Tx) chain connected to an input port when the rat-race coupler uses one port as the input port, and a reception (Rx) chain connected to the receive antenna and an isolated port when the rat-race coupler uses the one port as the input port. A first transceiving antenna corresponding to one of the plurality of transceiving antennas may be connected to a first output port of two output ports when the rat-race coupler uses the one port as the input port, and a second transceiving antenna of the plurality of transceiving antennas may be connected to a second output port of the two output ports. The receive antenna may be an reception (Rx) diversity antenna. Each of the plurality of transceiving antennas may be equally spaced from the receive antenna. The UE may support a full-duplex communication scheme.

In another aspect of the present invention, a method of cancelling an SI signal at a radio frequency (RF)-front end of a UE includes connecting a Tx chain to an input port using a rat-race coupler when the rat-race coupler uses one port as the input port, connecting an reception (Rx) chain to a receive antenna and an isolated port when the rat-race coupler uses the one port as the input port, and connecting a first transceiving antenna of a plurality of transceiving antennas to a first output port of two output ports when the rat-race coupler uses the one port as the input port, and connecting a second transceiving antenna of the plurality of transceiving antennas to a second output port of the two output ports. The receive antenna may be an Rx diversity antenna, and each of the plurality of transceiving antennas may transceive a signal. The UE may support a full-duplex communication scheme.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A may be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, access point (AP), etc. Throughout this specification, the technical features of the present invention are described based on an institute of electrical and electronic engineers (IEEE) 802.16 system, but may be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

Figure 2:
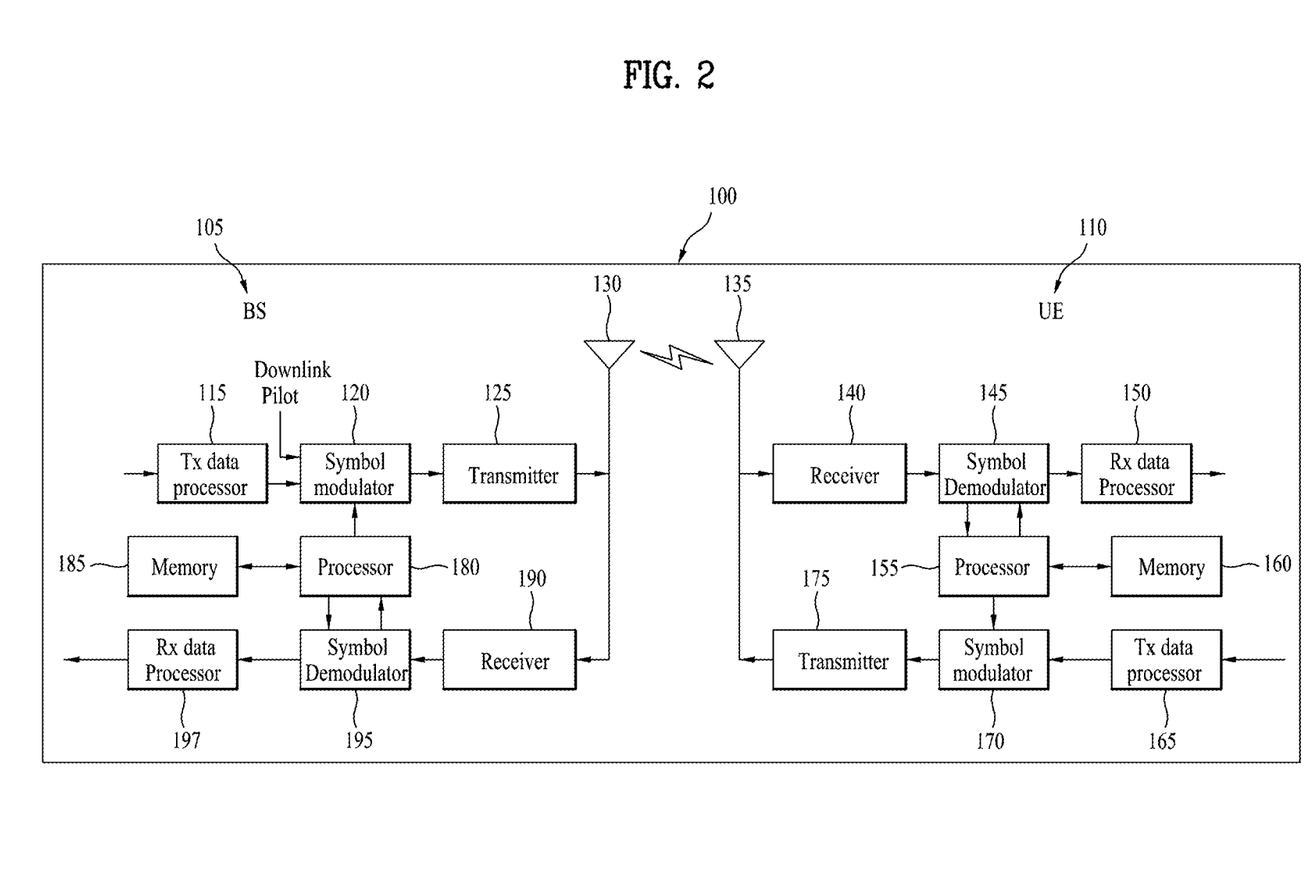
FIG. 2 is a block diagram illustrating a structure of a BS 105 and a UE 110 in a wireless communication system 100.

FIG. 2 is a block diagram illustrating a structure of a base station (BS) 105 and a user equipment (UE) 110 in a wireless communication system 100.

Although one BS 105 and one UE 110 (including a D2D UE) are illustrated in order to simply illustrating the wireless communication system 100, the wireless communication system 100 may include one or more BSs and/or one or more UEs.

Referring to FIG. 2, the BS 105 may include a transmission (Tx) data processor 115, a symbol modulator 120, a transmitter 125, a Tx/Rx antenna 130, a processor 180, a memory 185, a receiver 190, a symbol demodulator 195, and a reception (Rx) data processor 197. In addition, the UE 110 may include a Tx data processor 165, a symbol demodulator 170, a transmitter 175, a Tx/Rx antenna 135, a processor 155, a memory 160, a receiver 140, a symbol demodulator 145, and an Rx data processor 150. Although FIG. 2 illustrates that each of the BS 105 and the UE 110 includes the Tx/Rx antennas 130 and 135, respectively, each the BS 105 and the UE 110 includes a plurality of Tx/Rx antennas. Accordingly, the BS 105 and the UE 110 according to the present invention support a multiple input multiple output (MIMO) system. In addition, the BS 105 according to the present invention may support both single user-MIMO (SU-MIMO) and multi user-MIMO (MU-MIMO) schemes.

In downlink, the Tx data processor 115 receives traffic data, formats and codes the received traffic data, and interleaves and modulates (or symbol-maps) the coded traffic data to provide modulated symbols ("data symbols"). The symbol modulator 120 receives and processes the data symbols and pilot symbols to provide a stream of symbols.

The symbol modulator 120 multiplexes the data and pilot symbols and transmits the multiplexed data and pilot symbols to the transmitter 125. In this case, each transmitted symbol may be a data symbol, a pilot symbol, or a zero signal value. In each symbol period, pilot symbols may be consecutively transmitted. The pilot symbols may each be a frequency division multiplexing (FDM) symbol, an orthogonal frequency division multiplexing (OFDM) symbol, a time division multiplexing (TDM) symbol, or a code division multiplexing (CDM) symbol.

The transmitter 125 receives the stream of symbols, converts the stream into one or more analog signals, and further adjusts (e.g., amplifies, filters, and frequency-upconverts) the analog signals to generate a downlink signal appropriate for transmission via a radio channel. Then the Tx antenna 130 transmits the generated downlink signal to the UE 110.

In the structure of the UE 110, the Rx antenna 135 receives the downlink signal from the BS 105 and provides the received signal to the receiver 140. The receiver 140 adjusts (e.g., filters, amplifies, and frequency-downconverts) the received signal and digitizes the adjusted signal to acquire samples. The symbol demodulator 145 demodulates the received pilot symbols and provides the pilot symbols to the processor 155 for channel estimation.

In addition, the symbol demodulator 145 receives a frequency response estimated value for downlink from the processor 155, data-demodulates the received data symbols to acquires data symbol estimated values (which is estimated values of the transmitted data symbols), and provides the data symbol estimated values to the Rx data processor 150. The Rx data processor 150 demodulates (i.e., symbol-demaps), deinterleaves, and decodes the data symbol estimated values to recover the transmitted traffic data.

Processing operations by the symbol demodulator 145 and the Rx data processor 150 are complementary to processing operations of the symbol modulator 120 and the Tx data processor 115 in the BS 105, respectively.

In uplink, the Tx data processor 165 of the UE 110 processes traffic data to provide data symbols. The symbol demodulator 170 may receive and modulate the data symbols and provide a stream of the symbols to the transmitter 175. The transmitter 175 receives and processes the stream of symbols to generate an uplink signal. In addition, the Rx antenna 135 transmits the generate uplink signal to the BS 105.

In the BS 105, an uplink signal from the UE 110 is received by the Rx antenna 130, and the receiver 190 processes the received uplink signal to acquire samples. Then the symbol demodulator 195 processes the samples to provide pilot symbols and data symbol estimated values which are received for downlink. The reception (Rx) data processor 197 processes the data symbol estimated values to recover the traffic data transmitted from the UE 110.

The processors 155 and 180 of the UE 110 and the BS 105 order (e.g., controls, manipulates, manages, etc.) operations of the UE 110 and the BS 105, respectively. The processors 155 and 180 may be respectively connected to the memories 160 and 185 which store program codes and data. The memories 160 and 185 are respectively connected to the processors 155 and 180 and store an operating system, application, and general files.

The processors 155 and 180 may be referred to as a controller, a microcontroller, a microprocessor, a microcomputer, or the like. The processors 155 and 180 may each be embodied by hardware, firmware, software, or a combination thereof. When an embodiment of the present invention is embodied by hardware, the processors 155 and 180 may include application specific integrated circuits (ASICs), digital signal processors (DSPs), digital signal processing devices (DSPDs), programmable logic devices (PLDs), field programmable gate arrays (FPGAs), or the like which is configured to execute the present invention.

When an embodiment of the present invention is embodied by firmware or software, firmware or software may be configured in the form of a module, a procedure, a function, etc. which perform function or operations according to the present invention. Firmware or software configured to implement the present invention may be included in the processors 155 and 180 or stored in the memories 160 and 185 and driven by the processors 155 and 180.

Layers of a wireless interface protocol between wireless communication systems (network) of the UE 110 and the BS 105 may be classified into a first layer L1, a second layer L2, and a third layer L3 based on three lower layers of an open system interconnection (OSI) model that is well known in a communication system. A physical layer belongs to the first layer L1 and provides an information transfer service through a physical channel. A radio resource control (RRC) layer belongs to the third layer (L3) and provides control radio resources between the UE 110 and a network. The UE 110 and the BS 105 may exchange RRC messages through a wireless communication network and an RRC layer.

Throughout this specification, the processor 155 of the UE 110 and the processor 180 of the BS 105 perform an operation for processing signals and data except for a function of receiving or transmitting signals by the UE 110 and the BS 105 or a storing function. However, hereinafter, for convenience of description, the processors 155 and 180 will not be specially stated. Unless the processors 155 and 180 are not stated, a series of operations such as data processing but not the function of transmitting or receiving signals and the storing function may be performed.

Figure 3:
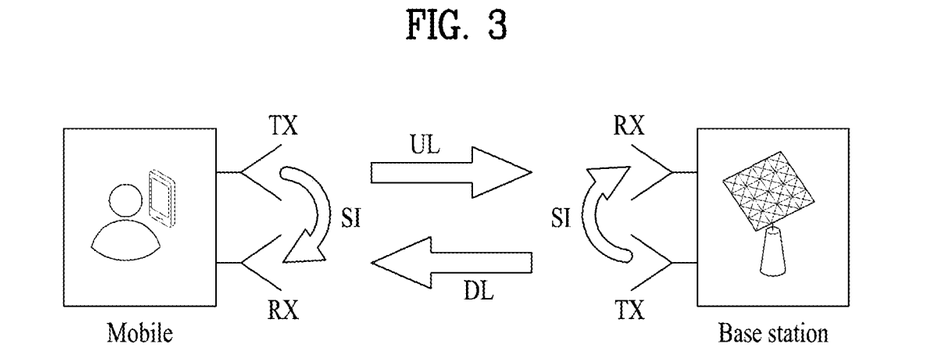
FIG. 3 is a conceptual diagram illustrating self-interference (SI)

FIG. 3 illustrates a concept of self-interference (SI).

As illustrated in FIG. 3, a signal transmitted by a user equipment UE1 is received by an Rx antenna of the same user equipment without change to function as interference (which is referred to as SI). This type of interference involves particular points unlike other forms of interference. The particular points are as below. First, a signal that functions as the interference may be regarded as a perfectly known signal. Second, the signal that functions as the interference has significantly greater power than that of a desired signal. As a result, the signal that functions as the interference may not be completely cancelled at a receiving end even though the signal is perfectly known.

FDR takes advantage of two existing schemes of time division duplex (TDD) and frequency division duplex (FDD). In addition, FDR is a communication scheme of simultaneously performing transmission and reception in the same frequency domain. In this instance, a problem of an SI signal occurs. The SI signal refers to a signal that returns to a receiving end after being transmitted. Since a transmission frequency band is the same as a reception frequency band in FDR, a received signal and the SI signal may not be distinguished from one another at a radio frequency (RF) end. SI cancellation (SIC) is a core technology of FDR. In general, SIC is performed in two steps in FDR. In the first step corresponding to passive cancellation, transmission and reception paths are separated from each other using a circulator at an antenna end or using different radio wave polarizations between transmission and reception. In the second step corresponding to active cancellation, an SI signal that remains after the passive cancellation is cancelled before entering a low noise amplifier (LNA). In a basic principle of the active cancellation, an SI duplicate signal is generated independently of a receiving end path and is subtracted from a receiving end signal which is made up of a sum of a received signal and a remaining SI signal.

Figure 4:
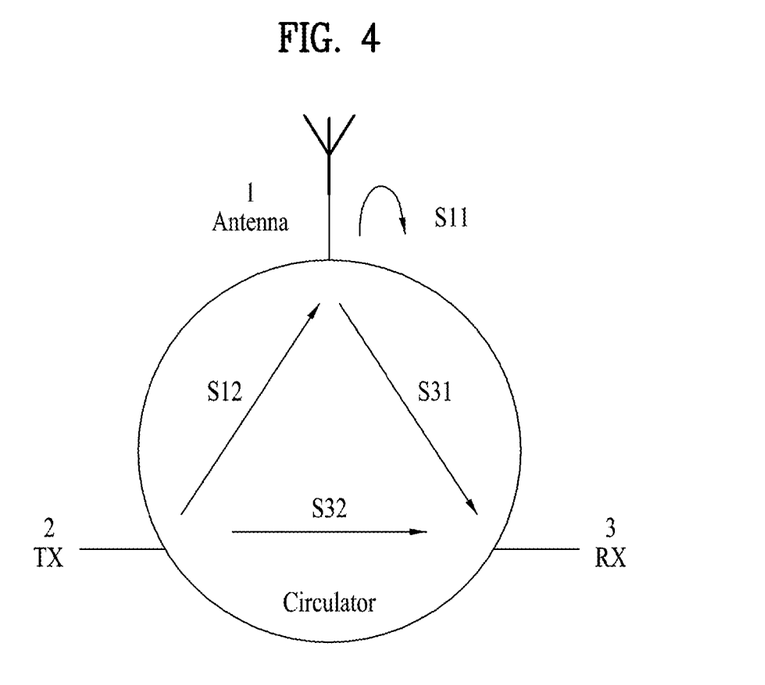
FIG. 4 is a conceptual diagram illustrating passive cancellation using a circulator.

FIG. 4 illustrates the passive cancellation using the circulator.

The circulator is basically a 3-port device and is intended to deliver a signal input to each port in one direction. In an ideal circulator, equations S12=S31=1 and S32=0 are satisfied, and perfect isolation may be obtained between a Tx antenna and an Rx antenna. However, in practice, isolation of the circulator is limited and is generally restricted to S32=−15 dB.

Referring to FIG. 4, the SI signal from the Tx antenna to the Rx antenna is made up of a sum of two types of signals below.

① TX direct leakage signal: S32
② Antenna mismatch SI signal: S12*S11*S31≈S11

The type ①  signal exhibits isolation performance of −15 dB in a general circulator. In an existing FDR scheme using the circulator, an SI signal is modeled only by the type ① signal (corresponding to the TX direct leakage signal) and thus SIC of −15 dB is achieved using the passive cancellation scheme. However, the type ② signal (≈S11) may have a greater magnitude than that of the type ① signal (S32) depending on conditions. Referring to FIG. 4, S11 refers to a signal corresponding to a Tx signal which is transmitted to an antenna and returns to the circulator again due to antenna mismatch. Due to an operation characteristic of the circulator, the signal enters an Rx port without being filtered. In a circumstance in which the antenna mismatch is significant (for example, in a surrounding environment having a lot of reflectors), S11 is −10 dB and thus an SI signal substantially greater than the type ① signal enters the Rx port.

Therefore, the passive cancellation scheme using the circulator fails to provide a mechanism for cancelling the SI signal generated due to the antenna mismatch and thus may not achieve significant SIC performance. In addition, when the circulator is used at an RF front-end for full-duplex radio communication, a ferrite material needs to be included due to an operation mechanism of the circulator. Thus, the RF front-end may not be integrated. Moreover, when SIC performance of the first step corresponding to the passive cancellation is −15 dB, problems of losses of Rx and Tx signals and an increase in power consumption occur. Here, the problems occur when SIC of the additional second step corresponding to the active cancellation is performed.

Figure 5:
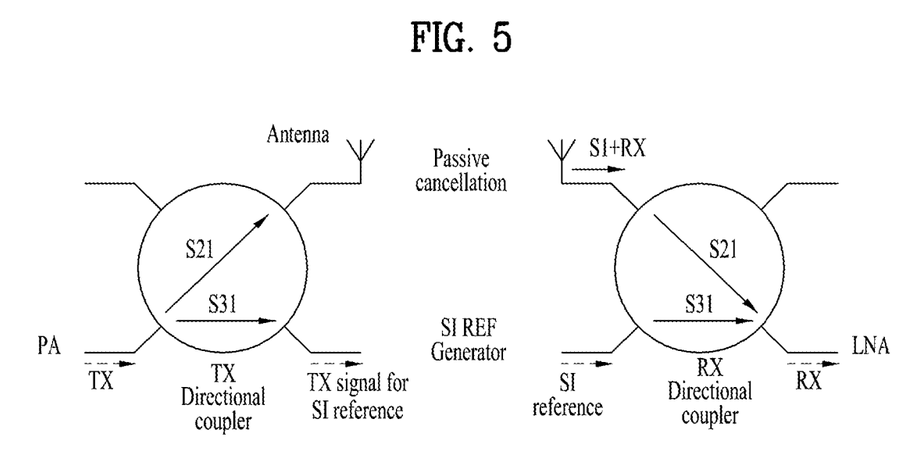
FIG. 5 is a conceptual diagram illustrating active cancellation.

FIG. 5 illustrates a concept of the active cancellation.

Referring to FIG. 5, a slight part of a Tx signal coming from a front of a power amplifier is sent to an SI REF generator using a Tx directional coupler, and the SI REF generator generates a signal (SI reference signal) identical to an SI signal that remains after the passive cancellation using the Tx signal. The duplicated SI reference signal corresponding to an SI signal entering together with an Rx signal is subtracted using an Rx directional coupler. Referring to FIG. 5, the SI signal and the duplicated SI reference signal arriving at an input port of an LNA have the same power. Due to a characteristic of the directional coupler, an equation S21+S31=1 is satisfied at all times and an inequality S21 ≫ S31 is satisfied to minimize the Tx and Rx losses, which indicates that the Tx and Rx losses may be minimized through a high level of SIC using the passive cancellation. When the SI signal and the duplicated SI reference signal arriving at the input port of the LNA need to have the same power, an amplifier needs to be used in the SI REF generator to reduce the Tx and Rx losses using restricted SIC performance of the passive cancellation, which causes additional power consumption of the SI REF generator.

Figure 6:
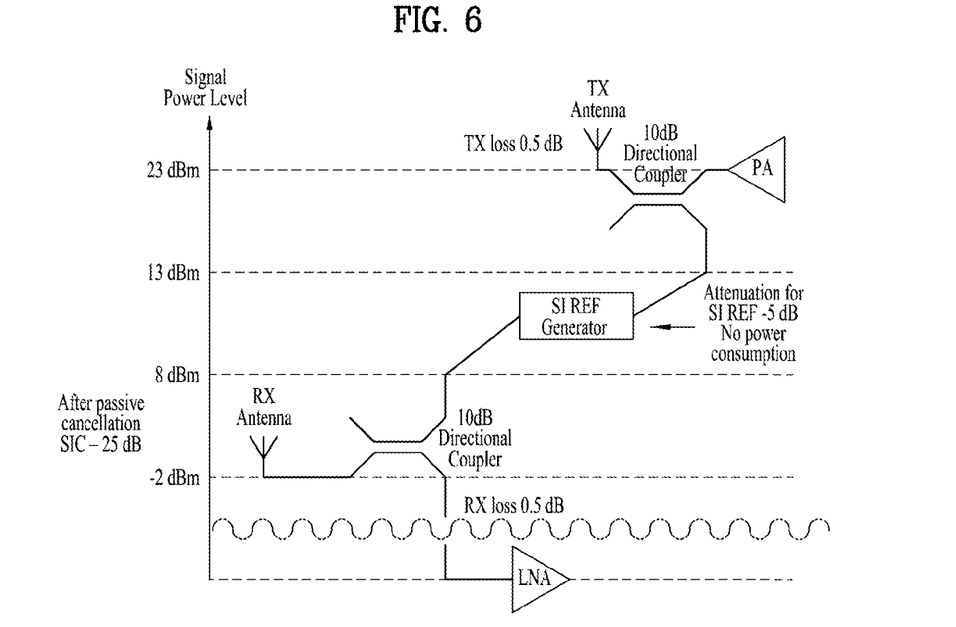
FIG. 6 is a graph illustrating cost, transmission (Tx) and reception (Rx) losses, and additional power consumption resulting from the active cancellation of FIG. 5.

FIG. 6 illustrates cost, the Tx and Rx losses, and the additional power consumption resulting from the active cancellation of FIG. 5.

FIG. 6 corresponds to a case in which the Rx and Tx directional couplers corresponding to Rx/Tx loss of 0.5 dB are used and passive cancellation SIC is −25 dB. For the active cancellation, the slight part of the Tx signal coming from the power amplifier is sent to the SI REF generator using the Tx directional coupler. In this instance, the Tx loss of 0.5 dB is generated. In addition, FIG. 6 illustrates that the Rx loss of 0.5 dB is generated when the duplicated SI reference signal corresponding to the SI signal entering together with the Rx signal is subtracted using the Rx directional coupler.

Figure 7:
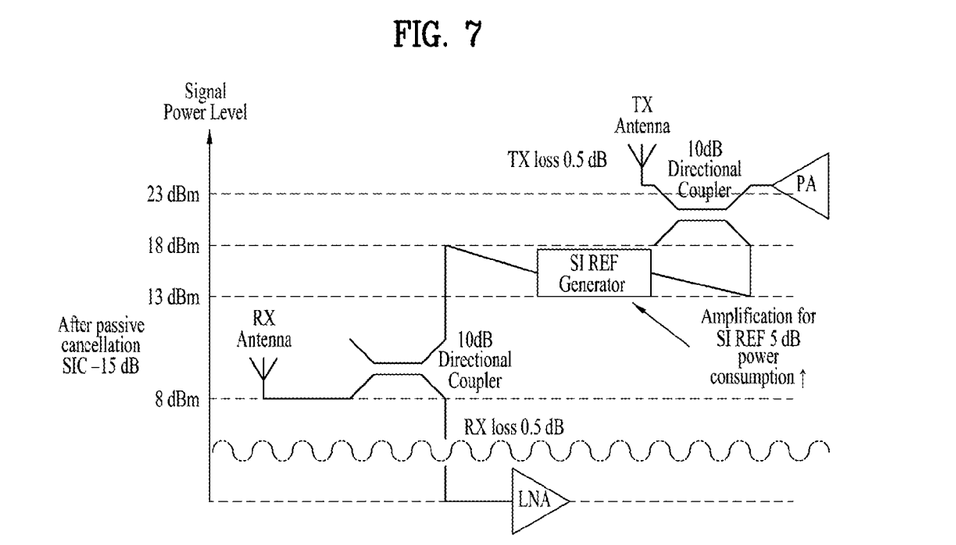
FIG. 7 is a graph illustrating cost, Tx and Rx losses, and additional power consumption resulting from the active cancellation of FIG. 5.

FIG. 7 illustrates cost, the Tx and Rx losses, and the additional power consumption resulting from the active cancellation of FIG. 5.

FIG. 7 corresponds to a case in which the Rx and Tx directional couplers corresponding to Rx/Tx loss of 0.5 dB are used and passive cancellation SIC is −15 dB. Similarly to FIG. 6, for the active cancellation, the slight part of the Tx signal coming from the power amplifier is sent to the SI REF generator using the Tx directional coupler. In this instance, the Tx loss of 0.5 dB is generated. In addition, the Rx loss of 0.5 dB is generated when the duplicated SI reference signal corresponding to the SI signal entering together with the Rx signal is subtracted using the Rx directional coupler. Referring to FIG. 7, the amplifier is used in the SI REF generator to reduce the Tx loss, resulting in the additional power consumption.

Figure 8:
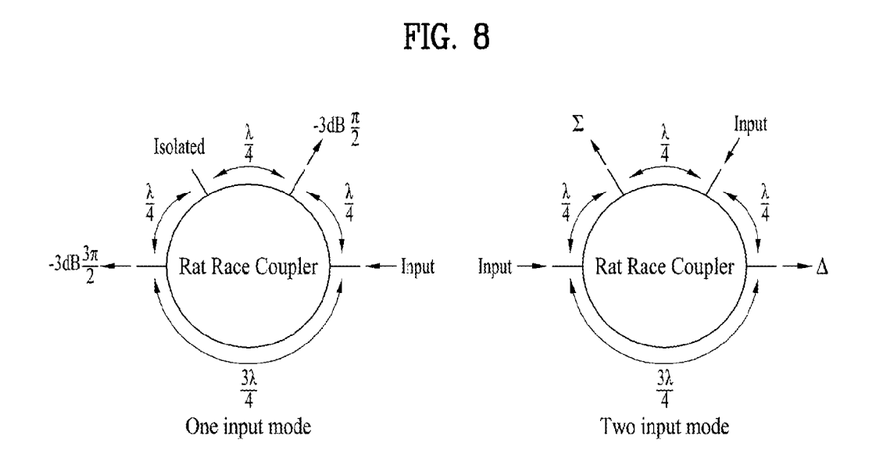
FIG. 8 is a diagram illustrating an operation principle of a rat-race coupler.

FIG. 8 illustrates an operation principle of a rat-race coupler.

The rat-race coupler (also known as a hybrid ring coupler) is a type of coupler used in RF and Microwave systems. In its simplest form it is a 3 dB coupler and is thus an alternative to a magic tee. Compared to the magic tee, it has the advantage of being easy to realize in planar technologies such as microstrip and stripline, although waveguide rat races are also practical. Unlike magic tees, a rat-race needs no matching structure to achieve correct operation.

The rat-race coupler has four ports, each placed one quarter wavelength away from each other around the top half of the ring. The bottom half of the ring is three quarter wavelengths in length. The ring has a characteristic impedance of factor compared to port impedance.

A signal input on port 1, will be split between ports 2 and 4, and port 3 will be isolated. Rat-race couplers are used to sum two in-phase combined signals with essentially no loss or to equally split an input signal with no resultant phase difference between its outputs. It is also possible to configure the coupler as a 180 degree phase-shifted output divider or to sum two 180 degree phase-shifted combined signals with almost no loss.

As described in the foregoing, when the rat-race coupler includes four ports, and one of the ports is used as an input port (one-input mode of FIG. 8), two ports operate as output ports to send signals having a phase difference of 180 degrees, and the remaining one port operates as an isolated port (−40 dB). Alternatively, when two ports are used as input ports (two-input mode of FIG. 8), the remaining two ports operate as output ports to send a sum signal and a difference signal, respectively, of input signals.

Figure 9:
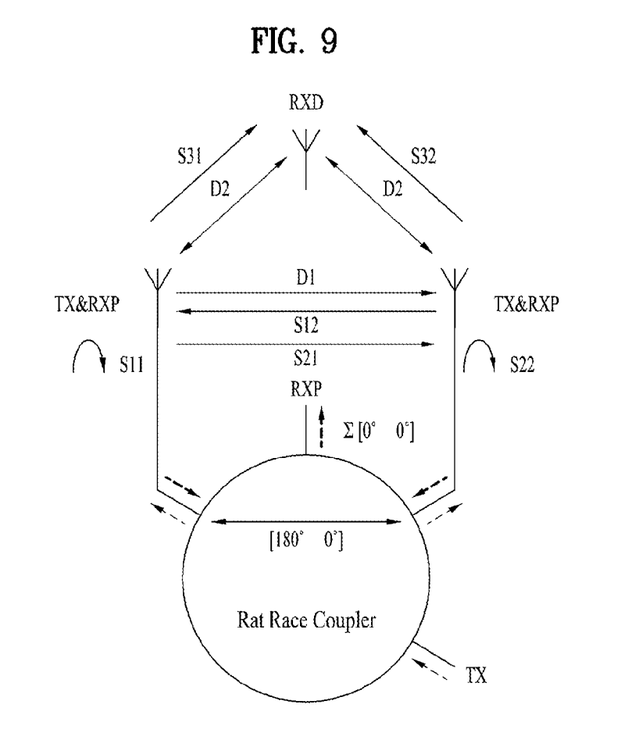
FIG. 9 is a diagram illustrating an antenna arrangement and a signal power flow at a radio frequency (RF)-front end according to the present invention.

FIG. 9 illustrates an antenna arrangement and a signal power flow at the RF-front end according to the present invention.

RX diversity gain may be obtained by installing an RXD antenna in a TX null region at a position having the same space as that of a pair of TX & RXP antennas capable of acquiring effect of cancelling an SI signal in addition to separating a TX path and an RX path from each other in place of the circulator when two antennas are used in a UE using a characteristic of the rat-race coupler.

Referring to FIG. 9, when a signal enters one Tx port, signals having a phase difference of 180 degrees enter TX & RXP ports, respectively, according to a characteristic of the one-input mode of the rat-race coupler. Therefore, signals S12 and S21 have a phase difference of 180 degrees. An RX primary antenna port (RXP port) is installed in an original TX isolation port (for example, the isolated port of FIG. 8) using the two-input mode of the rat-race coupler. In addition, signals having the same phase and entering the TX & RXP ports may be received through two input ports of the rat-race coupler. Referring to an SIC operation characteristic, SI signals that return after being generated due to antenna mismatch are S11 and S22 in FIG. 8. An SI signal entering an RXP port is S11−S22+S12−S21. Due to a characteristic of an antenna which is a passive electrical element, S12 equals S21 irrespective of a surrounding environment. Thus, S11−S22 is an SI signal that substantially enters the RXP port. In this instance, it is possible to experimentally obtain an antenna arrangement of D2=⅙ λ, when S11 and S22 have the most similar levels irrespective of the surrounding environment.

Figure 10:
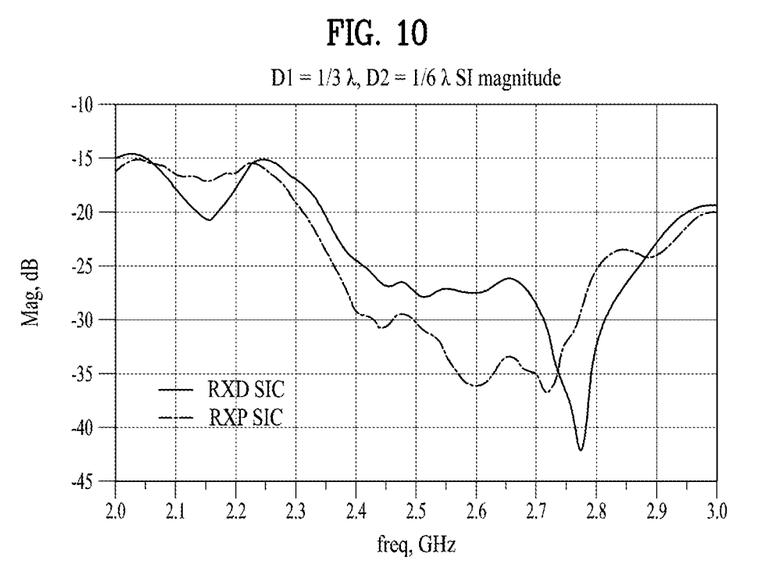
FIG. 10 is a graph illustrating self-interference cancellation (SIC) performance of RXP/RXD passive cancellation with respect to frequency in the antenna arrangement of FIG. 9.

FIG. 10 illustrates SIC performance of RXP/RXD passive cancellation with respect to frequency in a graph in the antenna arrangement of FIG. 9.

Referring to FIG. 10, an antenna bandwidth is set to 2.4 to 2.6 GHz, and a magnitude of SI is depicted when D1 equals ⅓ λ, and D2 equals ⅙ λ. The RXP SIC ranges from −25 to 30 dB. In a proposed configuration, D2=⅙ λ, is used as an arrangement for optimal RXP SIC irrespective of a surrounding environment. However, another distance may be used as optimal D2 according to a given characteristic of an individual antenna. An SI signal entering an RX diversity antenna port (RXD port) is S31−S32, and S31 equals S32 when antennas are arranged at equal intervals (D2 in FIG. 9). Thus, the RXD SIC ranges from −25 to 30 dB similarly to the RXP SIC.

Figure 11:
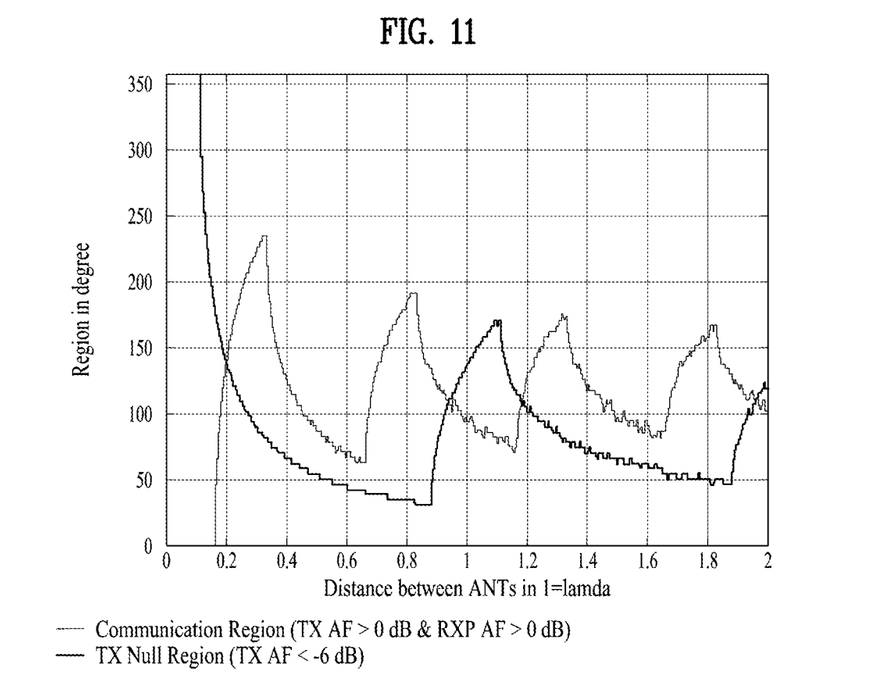
FIG. 11 is a graph illustrating a conformity degree of TX and RXP beam patterns according to D1 and the area of a TX null region.

FIG. 11 illustrates a conformity degree of TX and RXP beam patterns according to D1 and the area of the TX null region.

Figure 12:
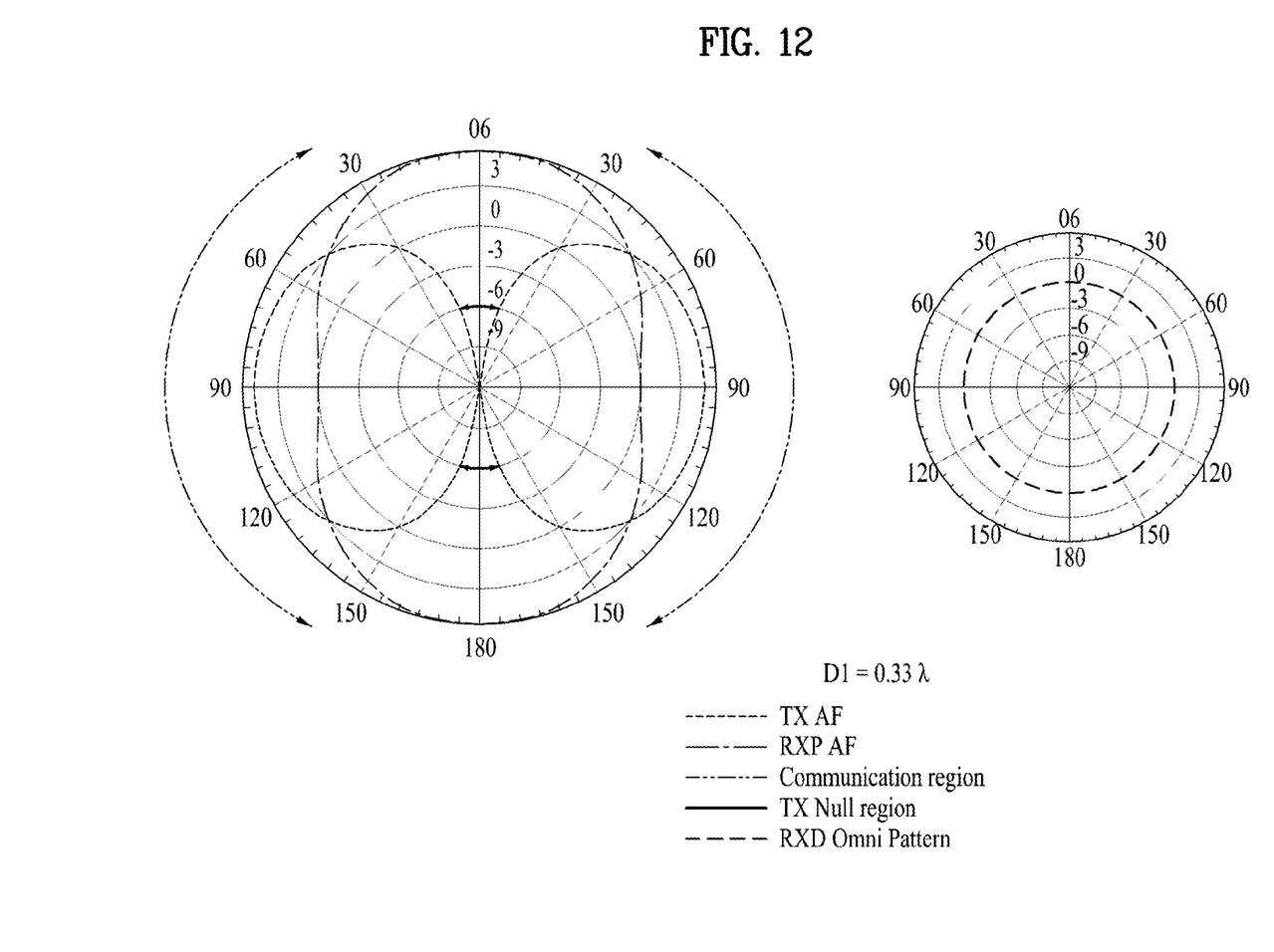
FIG. 12 is a diagram illustrating TX and RXP individual beam patterns when D1 equals ⅓ λ.

When signals having the same phase are received through the RXP port and signals having a phase difference of 180 degrees are transmitted through the TX port using the rat-race coupler, an additional problem may occur. The problem is that the TX and RXP beam patterns are different from each other, and the TX null region is generated. Thus, D1 is set to a distance at which the TX and RXP beam patterns closely match each other and the TX null region is minimized FIG. 11 illustrates a size of an area in which both TX and RXP arrangement beamforming gains according to the distance D1 are 0 dB or more. The area corresponds to about 240 degrees, which is a maximum value, when D1 equals ⅓ λ. FIG. 12 illustrates TX and RXP individual beam patterns when D1 equals ⅓ λ.

Figure 13:
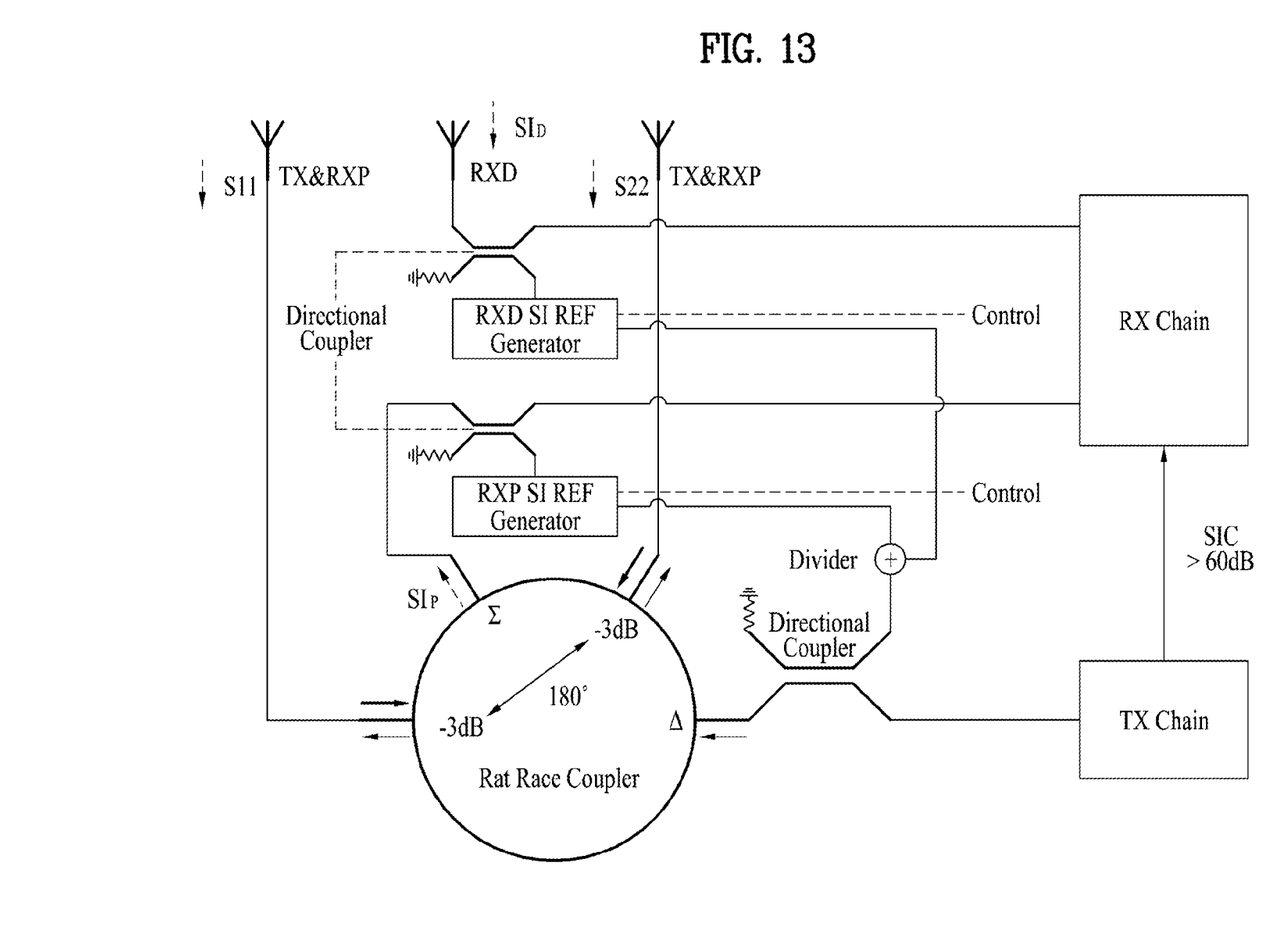
FIG. 13 is a diagram illustrating the entire configuration of a 1TX2RX full-duplex RF front-end using the rat-race coupler proposed in the present invention.

FIG. 13 illustrates the entire configuration of a 1TX2RX full-duplex RF front-end using the rat-race coupler proposed in the present invention.

The 1TX2RX full-duplex RF front-end illustrated in FIG. 13 includes the rat-race coupler, the pair of TX & RXP antennas, the RXD antenna, and the SI REF generator as an additional active cancellation RF SI signal cancellation device for an individual RX of each of RX primary (RXP) and RX diversity (RXD). S11 and S22 denote Tx reflected signals generated due to antenna mismatch, $SI_D$ denotes an SI signal returning to an RXD path, $SI_P$ denotes an SI signal returning to an RXP path, and SIC refers to self-interference signal cancellation. The TX & RXP antennas may be equally spaced from the RXD antenna as in FIG. 9.

Referring to FIG. 13, due to the characteristic of the one-input mode of the rat-race coupler, when a signal output from a Tx chain enters one Tx port, signals having a phase difference of 180 degrees enter TX and RXP ports, respectively. SI signals that return after being generated due to antenna mismatch are S11 and S22.

The original TX isolation port (for example, the isolated port of FIG. 8) is connected to an Rx chain using the two-input mode of the rat-race coupler. The two input ports of the rat-race coupler may receive signals having the same phase from the TX & RXP antennas. Referring to the SIC operation characteristic, SI signals that return after being generated due to antenna mismatch are S11 and S22. Therefore, $SI_P$ is S11−S22. Due to the characteristic of the antenna which is the passive electrical element, S12 equals S21 irrespective of the surrounding environment. Thus, S11−S22 is an SI signal that substantially enters the Rx chain. In this instance, it is possible to appropriately adjust a distance between the pair of TX & RXP antennas so that S11 and S22 have the most similar levels irrespective of the surrounding environment to satisfy an equation S11−S22=0. As described above, when the equation S11−S22=0 is experimentally satisfied, an interval of ⅙ λ, is maintained between antennas.

As described in the foregoing, when full-duplex radio communication is implemented, efficiency for frequency resource utilization may be doubled compared to half duplex radio communication. In addition, unlike an existing configuration using the circulator, passive cancellation SIC performance (−25 to 30 dB) is excellent when the rat-race coupler is used. Thus, power consumption for additional RF SIC may be reduced. The rat-race coupler, which is a core device of the present invention, may be generated using an inductor and a capacitor and thus may be integrated and applied to a UE.

According to embodiments of the present invention, it is possible to provide an RF front-end for full-duplex radio communication, and particularly, a structure of the RF front-end which may be integrated suitably for a UE. In addition, it is possible to achieve SI signal cancellation efficiency in a wider frequency range when compared to an existing structure to implement full-duplex radio communication.

It will be appreciated by persons skilled in the art that that the effects that can be achieved through the present invention are not limited to what has been particularly described hereinabove and other advantages of the present invention will be more clearly understood from the above detailed description.

The aforementioned embodiments are achieved by a combination of structural elements and features of the present invention in a predetermined manner. Each of the structural elements or features should be considered selectively unless otherwise specified. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. It will be apparent that some claims not explicitly referring to one another may be combined to constitute an embodiment or to be included as a new claim by means of amendment after the application is filed.

It will be apparent to those skilled in the art that the present invention may be embodied in other specific forms without departing from characteristics of the invention. Thus, the descriptions are to be considered in all respects as illustrative and not restrictive. The scope of the invention should be determined by reasonable interpretation of the appended claims and all change which comes within the equivalent scope of the invention are within the scope of the invention.

What is claimed is:

1. A user equipment (UE) for cancelling a self-interference (SI) signal, the UE comprising:
   a rat-race coupler;
   a plurality of transceiving antennas capable of transmitting and receiving signals;
   a receive antenna;
   a transmission (Tx) chain connected to an input port when the rat-race coupler uses one port as the input port; and
   a reception (Rx) chain connected to the receive antenna and an isolated port when the rat-race coupler uses the one port as the input port,
   wherein a first transceiving antenna of the plurality of transceiving antennas is connected to a first output port of two output ports when the rat-race coupler uses the one port as the input port, and a second transceiving antenna of the plurality of transceiving antennas is connected to a second output port of the two output ports.

2. The UE according to claim 1, wherein the receive antenna is an reception (Rx) diversity antenna.

3. The UE according to claim 1, wherein each of the plurality of transceiving antennas are equally spaced from the receive antenna.

4. The UE according to claim 1, wherein the UE supports a full-duplex communication scheme.

5. A method of cancelling an SI signal at a radio frequency (RF)-front end of a UE, the method comprising:
   connecting a transmission (Tx) chain to an input port of a rat-race coupler when the rat-race coupler uses one port as the input port;
   connecting an reception (Rx) chain to a receive antenna and an isolated port when the rat-race coupler uses the one port as the input port; and
   connecting a first transceiving antenna of a plurality of transceiving antennas to a first output port of two output ports when the rat-race coupler uses the one port as the input port, and connecting a second transceiving antenna of the plurality of transceiving antennas to a second output port of the two output ports.

6. The method according to claim 5, wherein the receive antenna is an reception (Rx) diversity antenna, and each of the plurality of transceiving antennas is capable of transmitting and receiving signals.

7. The method according to claim 5, wherein the UE supports a full-duplex communication scheme.

* * * * *